(12) United States Patent
Shigeta et al.

(10) Patent No.: US 11,220,430 B2
(45) Date of Patent: Jan. 11, 2022

(54) METHOD AND SYSTEM FOR PRODUCING PURIFIED AQUEOUS HYDROGEN PEROXIDE SOLUTION

(71) Applicant: MITSUBISHI GAS CHEMICAL COMPANY, INC., Chiyoda-ku (JP)

(72) Inventors: Kohei Shigeta, Katsushika-ku (JP); Yasuhiro Kushida, Kamisu (JP); Tetsuya Yamamoto, Kamisu (JP); Shinichiro Matsuura, Kamisu (JP); Hidetoshi Ikeda, Katsushika-ku (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 217 days.

(21) Appl. No.: 16/476,957

(22) PCT Filed: Feb. 21, 2018

(86) PCT No.: PCT/JP2018/006097
§ 371 (c)(1),
(2) Date: Jul. 10, 2019

(87) PCT Pub. No.: WO2018/155465
PCT Pub. Date: Aug. 30, 2018

(65) Prior Publication Data
US 2019/0352179 A1    Nov. 21, 2019

(30) Foreign Application Priority Data

Feb. 22, 2017  (JP) ............................. JP2017-030976

(51) Int. Cl.
*C01B 15/013* (2006.01)
*B01D 3/14* (2006.01)
(Continued)

(52) U.S. Cl.
CPC .............. *C01B 15/013* (2013.01); *B01D 3/14* (2013.01); *B01J 39/04* (2013.01); *B01J 41/04* (2013.01); *B01J 47/04* (2013.01)

(58) Field of Classification Search
None
See application file for complete search history.

(56) References Cited

U.S. PATENT DOCUMENTS 3,043,666 A    7/1962    Siwinski
3,073,755 A    1/1963    Banfield et al.
(Continued)

FOREIGN PATENT DOCUMENTS

GB    1 326 282    8/1973
JP    37-8256    7/1962
(Continued)

OTHER PUBLICATIONS

International Search Report dated Apr. 24, 2018, in PCT/JP2018/006097 filed on Feb. 21, 2018.

*Primary Examiner* — Sudhakar Katakam
*Assistant Examiner* — Jennifer C Sawyer
(74) *Attorney, Agent, or Firm* — Oblon, McClelland, Maier & Neustadt, L.L.P.

(57) ABSTRACT

Provided are a method and system for efficiently producing a purified aqueous hydrogen peroxide solution having a high purity. This method for producing a purified aqueous hydrogen peroxide solution comprises: step A for vaporizing a raw material containing a crude aqueous hydrogen peroxide solution; step B for condensing at least a portion of the gas and liquid obtained in step A, and separating the gas and liquid into a gas phase and a liquid phase; and step C for returning, into the raw material, at least a portion of a separation liquid which is the separated liquid phase, (Continued)

wherein step C further includes step D for adjusting the concentration of hydrogen peroxide in the separation liquid.

9 Claims, 3 Drawing Sheets

(51) Int. Cl.
*B01J 39/04* (2017.01)
*B01J 41/04* (2017.01)
*B01J 47/04* (2006.01)

(56) References Cited

U.S. PATENT DOCUMENTS

| | | | |
|---|---|---|---|
| 3,152,052 A | | 10/1964 | Jenney et al. |
| 3,714,342 A | * | 1/1973 | Kabisch ............... C01B 15/023 423/588 |
| 5,456,898 A | * | 10/1995 | Shimokawa ........ C01B 15/0135 423/584 |
| 5,670,028 A | | 9/1997 | Inaba et al. |

FOREIGN PATENT DOCUMENTS

| | | |
|---|---|---|
| JP | 45-34926 | 11/1970 |
| JP | 5-201707 A | 8/1993 |
| JP | 7-80227 A | 3/1995 |
| JP | 9-503990 A | 4/1997 |
| JP | 2938952 B2 | 8/1999 |
| JP | 2001-172008 A | 6/2001 |
| WO | WO 95/04702 A1 | 2/1995 |

* cited by examiner

Fig. 1

Prior art

Example

Fig. 5

Comparative Example

METHOD AND SYSTEM FOR PRODUCING PURIFIED AQUEOUS HYDROGEN PEROXIDE SOLUTION

FIELD OF THE INVENTION

The present invention relates to a method and system for producing a purified aqueous hydrogen peroxide solution, for example, for use in the electronics industry, which is required to have high purity.

BACKGROUND ART

Hydrogen peroxide is industrially produced by autoxidation of anthraquinone. By the way, for example, in the field of semiconductor fabrication, as a cleaning agent, an etching liquid and others, a high-purity aqueous hydrogen peroxide solution is required. A crude aqueous hydrogen peroxide solution produced by an anthraquinone process contains a relatively large amount of impurities and has a low purity. Therefore, for providing the crude aqueous hydrogen peroxide solution produced by an anthraquinone process, for example, as a product for use in the electronics industry, it is necessary to further purify and concentrate the aqueous hydrogen peroxide solution to increase the purity of the solution.

Figure 1:
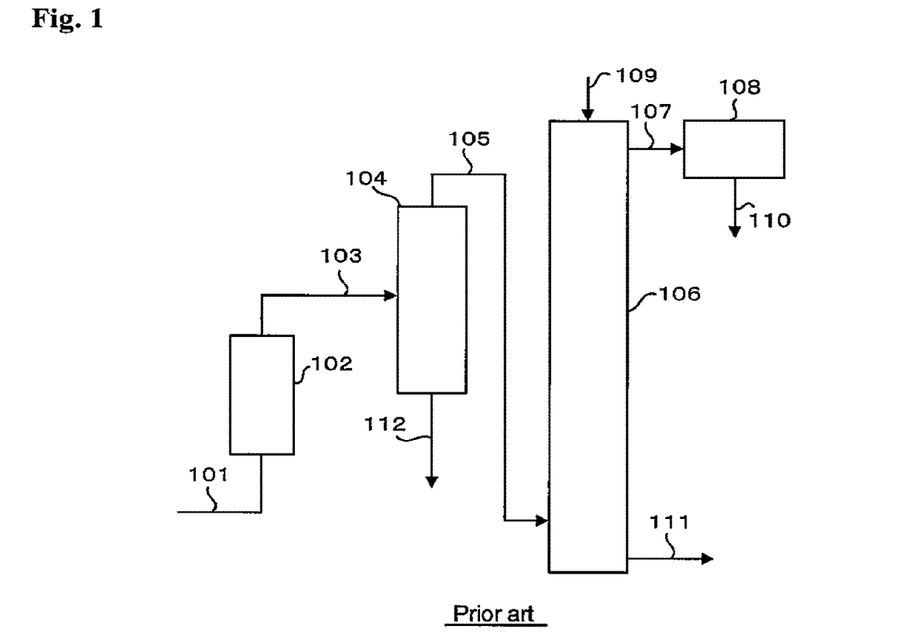
FIG. 1 A flow diagram of a conventional system for producing a purified aqueous hydrogen peroxide solution.

Conventionally, as a method for purifying and concentrating a crude aqueous hydrogen peroxide solution, for example, as disclosed in patent documents 1 to 6, various methods have been proposed, and, for example, the method shown in the flow of FIG. 1 has been generally practically used. In FIG. 1, a crude aqueous hydrogen peroxide solution which is a raw material is fed to vaporizer 102 from line 101, and the gas liquor from vaporizer 102 passes through line 103 and goes into gas-liquid separator 104. In gas-liquid separator 104, the gas liquor from vaporizer 102 is condensed and separated into vapor containing hydrogen peroxide and an aqueous hydrogen peroxide solution. The vapor separated in gas-liquid separator 104 passes through line 105 and goes into the bottom of rectifying column 106.

In rectifying column 106, the vapor rises and is reduced in the hydrogen peroxide concentration, while the liquid falls and is concentrated and increased in the hydrogen peroxide concentration. The concentrated purified aqueous hydrogen peroxide solution is taken out from line 111 at the bottom of the column. The vapor at the top of the column passes through line 107 and goes into condenser 108, so that condensed water containing substantially no hydrogen peroxide is discharged from line 110. Reflux water is fed to the column top from line 109.

Further, the aqueous hydrogen peroxide solution separated in gas-liquid separator 104 is taken out from line 112 and industrially utilized as an aqueous hydrogen peroxide solution of general purity quality.

PRIOR ART REFERENCES

Patent Documents

Patent document 1: U.S. Pat. No. 3,073,755
Patent document 2: British Patent No. 1326282
Patent document 3: Japanese Examined Patent Publication No. Sho 37-8256
Patent document 4: Japanese Examined Patent Publication No. Sho 45-34926
Patent document 5: Japanese Unexamined Patent Publication No. Hei 5-201707
Patent document 6: Japanese Patent No. 2938952

SUMMARY OF THE INVENTION

Problems to be Solved by the Invention

Recently, in the field of electronics industry in which semiconductors, printed wiring boards and others are produced, demand for a high-purity aqueous hydrogen peroxide solution having an extremely small amount of an impurity is increasing. According to the above-mentioned conventional purifying and concentrating method, a high-purity aqueous hydrogen peroxide solution in a small amount can be obtained from the rectifying column, and simultaneously, an aqueous hydrogen peroxide solution of general purity quality in a considerable amount is produced from the gas-liquid separator. The general aqueous hydrogen peroxide solution contains a certain amount of inorganic impurities and organic impurities, and this solution as such cannot be provided as a product, for example, for use in the electronics industry, which is required to have high purity.

In view of the above-mentioned problems, the present invention has been made, and an object of the present invention is to provide a method and system for producing a high-purity purified aqueous hydrogen peroxide solution having impurities reduced more efficiently than a conventional method or system.

Means for Solving the Problems

For solving the above-mentioned problems, the present invention is a method for producing a purified aqueous hydrogen peroxide solution, wherein the method comprises the steps of: vaporizing a raw material containing a crude aqueous hydrogen peroxide solution (step A); condensing at least part of the gas liquor obtained in the step A to separate it into a gas phase and a liquid phase (step B); and recycling at least part of the separated liquid which is the liquid phase separated in the step B to the raw material (step C), wherein the step C further comprises the step D of controlling the hydrogen peroxide concentration of the separated liquid.

In the above-mentioned method, it is preferred that the step D is performed by diluting the separated liquid with water.

In the above-mentioned method, it is preferred that the step C further comprises the step E of removing impurities from the separated liquid.

In the above-mentioned method, it is preferred that the step E is performed by bringing the separated liquid into contact with an ion-exchange resin.

In the above-mentioned method, it is preferred that the step C further comprises the step F of adding a stabilizer to the separated liquid.

It is preferred that the above-mentioned method further comprises the step G of concentrating the gas phase separated in the step B to obtain a purified aqueous hydrogen peroxide solution.

In the above-mentioned method, it is preferred that the step A is performed using a vaporizer.

In the above-mentioned method, it is preferred that the step B is performed using a gas-liquid separator.

In the above-mentioned method, it is preferred that the gas-liquid separator is a cyclone.

Further, the present invention is a system for producing a purified aqueous hydrogen peroxide solution, comprising a vaporizer for vaporizing a raw material containing a crude aqueous hydrogen peroxide solution, a gas-liquid separator for condensing at least part of the gas liquor obtained in the vaporizer to separate it into a gas phase and a liquid phase, and a line for recycling at least part of the separated liquid which is the liquid phase separated in the gas-liquid separator to the raw material, wherein the system comprises a concentration controlling device for controlling the hydrogen peroxide concentration of the separated liquid.

It is preferred that the control of the hydrogen peroxide concentration in the concentration controlling device is performed by diluting the separated liquid with water.

It is preferred that the above-mentioned system further comprises an apparatus for removing impurities from the separated liquid. Further, it is preferred that the removal of impurities is performed by bringing the separated liquid into contact with an ion-exchange resin.

It is preferred that the above-mentioned system further comprises an apparatus for adding a stabilizer to the separated liquid.

It is preferred that the above-mentioned system further comprises a rectifying column for concentrating the gas phase separated in the gas-liquid separator to obtain a purified aqueous hydrogen peroxide solution.

In the above-mentioned system, it is preferred that the gas-liquid separator is a cyclone.

Effects of the Invention

By the present invention, a high-purity purified aqueous hydrogen peroxide solution can be produced with higher production efficiency than that of a conventional method or system. Further, the purified aqueous hydrogen peroxide solution obtained by the present invention has reduced an organic impurity content, as compared to an aqueous hydrogen peroxide solution of general purity quality. Furthermore, the stability of the aqueous hydrogen peroxide solution which is to be re-concentrated as a raw material can be improved.

MODE FOR CARRYING OUT THE INVENTION

Figure 2:
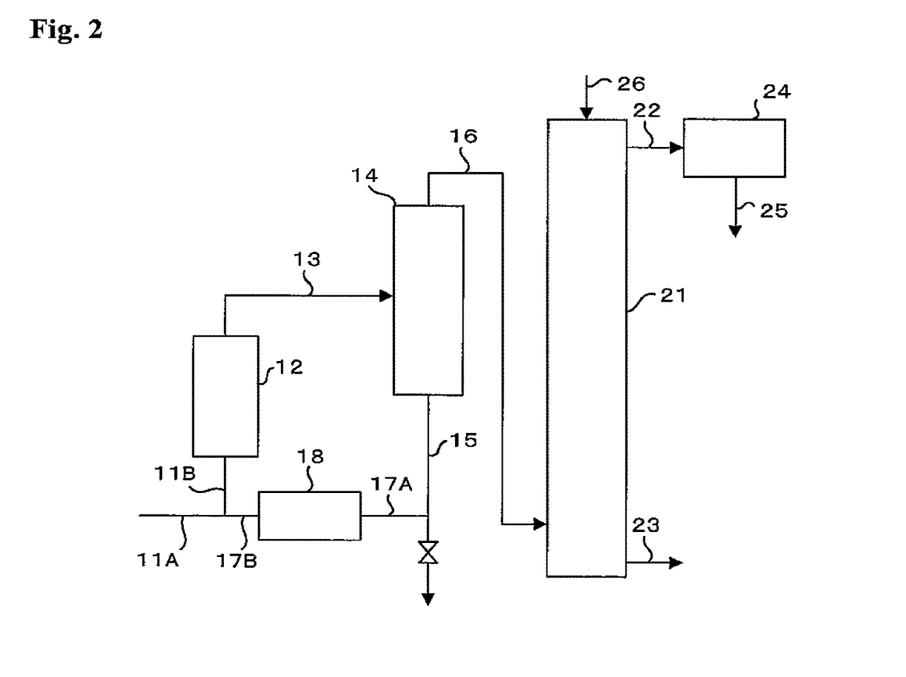
FIG. 2 A flow diagram of a system for producing a purified aqueous hydrogen peroxide solution according to an embodiment of the present invention.

Hereinbelow, a system for producing a purified aqueous hydrogen peroxide solution according to an embodiment of the present invention and a method for producing a purified aqueous hydrogen peroxide solution using the same will be described. FIG. 2 is a flow diagram diagrammatically showing the system for producing a purified aqueous hydrogen peroxide solution according to the present embodiment. The crude aqueous hydrogen peroxide solution to be fed as a raw material in the present system is produced by an anthraquinone process. In the anthraquinone process, generally, a 2-alkylanthraquinone is hydrogenated in a solvent in the presence of a hydrogenation catalyst to obtain a corresponding anthrahydroquinone. The catalyst is removed by filtration, and then the anthrahydroquinone is oxidized by oxygen or air to regenerate anthraquinone and to obtain hydrogen peroxide. The obtained hydrogen peroxide is extracted with water to obtain a hydrogen peroxide-containing aqueous solution. In the present specification, the raw material aqueous solution industrially obtained by the anthraquinone process is referred to as "crude aqueous hydrogen peroxide solution".

The crude aqueous hydrogen peroxide solution industrially obtained by the anthraquinone process contains hydrogen peroxide in an amount of 15 to 40 wt %, organic impurities in an amount of about 10 to 200 ppm (total carbon (TC)), and iron and/or aluminum ions as inorganic impurities in an amount of several tens to several hundred ppb. Meanwhile, for example, in the field of semiconductor fabrication, as a cleaning agent, an etching liquid and others, an aqueous solution having a hydrogen peroxide concentration as high as about 30 to 70 wt % is required. For this reason, it is necessary to further purify and concentrate the crude aqueous hydrogen peroxide solution containing impurities and having a relatively low concentration so as to have a higher purity and higher concentration.

The method for producing a purified aqueous hydrogen peroxide solution according to the present embodiment is descried with reference to FIG. 2.

Step A) A crude aqueous hydrogen peroxide solution which is a raw material is first fed from line 11A. Detailed description is made later, but at least part of the separated liquid separated in gas-liquid separator 14 is recycled as a liquid to be re-concentrated (re-concentration liquid) from line 17B to line 11A. Specifically, the re-concentration liquid recycled from line 17B is added to the crude aqueous hydrogen peroxide solution as a raw material flowing through line 11A. These liquids are mixed together in line 11B. The raw material mixed in line 11B is fed to vaporizer 12. The mixed raw material fed to vaporizer 12 is vaporized, and the resultant gas liquor in a mist form containing hydrogen peroxide is taken out through line 13.

Step B) The gas liquor taken out from vaporizer 12 passes through line 13 and goes into gas-liquid separator 14. In gas-liquid separator 14, at least part of the gas liquor taken out from vaporizer 12 is condensed. In gas-liquid separator 14, the gas liquor taken out from vaporizer 12 is separated into hydrogen peroxide vapor as a gas phase containing volatile impurities and an aqueous hydrogen peroxide solution as a liquid phase containing non-volatile impurities. The aqueous hydrogen peroxide solution as a liquid phase and the composition on the gas phase side are in a state of equilibrium. In the present specification, the aqueous hydrogen peroxide solution of general purity quality as a liquid phase separated in gas-liquid separator 14 is referred to as "separated liquid".

Figure 3:
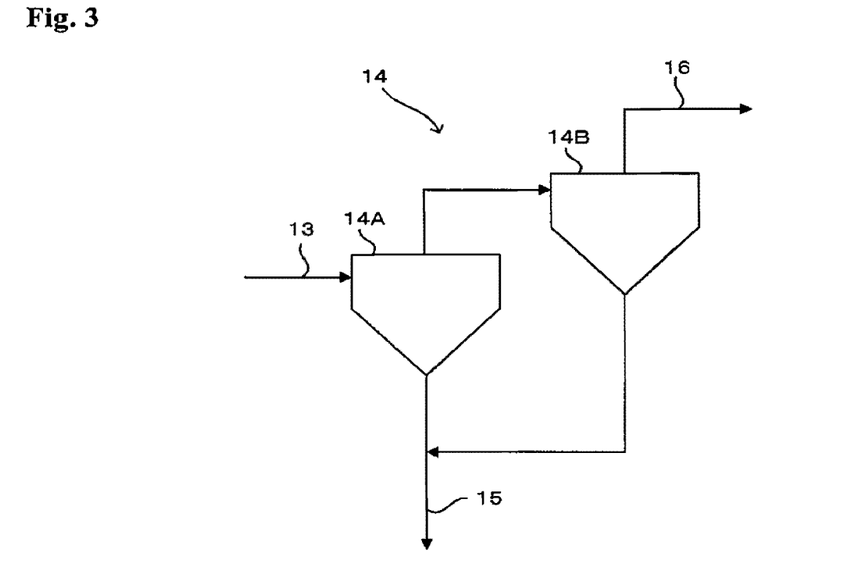
FIG. 3 A diagram showing an example in which two cyclones are arranged as a gas-liquid separator.

Gas-liquid separator 14 is preferably a cyclone because of its simple structure. The cyclone is preferably comprised of a single cyclone or a plurality of cyclones. The results of our studies have shown that the construction of a gas-liquid separator in which multiple cyclones are arranged in series enables excellent gas-liquid separation. However, when the number of the cyclones is increased, the effect of a pressure loss cannot be disregarded. Therefore, the number of the cyclones is more preferably two (double cyclones) or three, further preferably two (double cyclones). FIG. 3 shows an example of gas-liquid separator 14 of double cyclones in which two cyclones 14A, 14B are arranged.

As a material for gas-liquid separator (for example, the above-mentioned cyclone) 14, aluminum or stainless steel can be used. For suppressing decomposition of hydrogen peroxide, aluminum or an aluminum alloy is more preferred. Gas-liquid separator 14 may be a cyclone, or a column having a packing material or a mist separator of an inertial impaction system.

Step C) All of or part of the separated liquid containing hydrogen peroxide in a high concentration obtained from the lower portion of gas-liquid separator 14 passes through lines 15, 17A, concentration controlling device 18, and line 17B, and is recycled as a re-concentration liquid to line 11A for the raw material.

Step D) In the present embodiment, in concentration controlling device 18 which is, for example, a dilution tank, the separated liquid is controlled in its hydrogen peroxide concentration to obtain a re-concentration liquid. For example, it is preferred that the separated liquid is diluted by adding water to the liquid to control the hydrogen peroxide concentration of the re-concentration liquid recycled to the raw material. In the present specification, the aqueous solution having the hydrogen peroxide concentration controlled is referred to as "concentration-controlled aqueous solution".

Further, water used for diluting the separated liquid is preferably pure water, such as ion-exchanged water or distilled water. The separated liquid obtained in gas-liquid separator 14 preferably has a hydrogen peroxide concentration of 60 wt % or more. Therefore, in concentration controlling device 18, it is preferred that the separated liquid is diluted so that the hydrogen peroxide concentration of the re-concentration liquid recycled to the raw material becomes equivalent to the concentration of the crude aqueous hydrogen peroxide solution which is a raw material (for example, about 30 wt %).

Step E) It is preferred that the step of recycling the separated liquid obtained in gas-liquid separator 14 to the raw material as a re-concentration liquid includes an apparatus for removing impurities from the separated liquid. For example, in line 17A, by bringing the separated liquid into contact with an ion-exchange resin, metal components can be removed from the separated liquid. This not only removes impurities from the separated liquid but also improves the stability of the mixed raw material. With respect to the ion-exchange resin, a cation-exchange resin or a mixed bed of a cation-exchange resin and an anion-exchange resin can be used. By bringing the separated liquid obtained in gas-liquid separator 14 into contact with, for example, a cation-exchange resin, it is possible to effectively remove metals contained in the separated liquid, such as iron, aluminum, calcium, magnesium, sodium, and potassium. The removal of impurities may be performed using a filter as well as the above-mentioned ion-exchange resin. This removes, for example, fine powder generated from an ion-exchange resin. For increasing the production efficiency, the removal of impurities is preferably performed in a continuous type, but may be performed in a batch-type.

Step F) The system for producing a purified aqueous hydrogen peroxide solution according to the present embodiment may comprise an apparatus for adding a stabilizer to the separated liquid obtained in gas-liquid separator 14. As a stabilizer, for example, sodium pyrophosphate decahydrate, an organic phosphonic acid chelating agent, such as aminotri(methylenephosphonic acid), potassium stannate, ammonium nitrate, an organic carboxylic acid, or phosphoric acid can be used.

Step G) The hydrogen peroxide vapor separated as a gas phase in gas-liquid separator 14 passes through line 16 and goes into rectifying column 21. In rectifying column 21, the vapor rises and is reduced in the hydrogen peroxide concentration. The liquid falls and is increased in the hydrogen peroxide concentration. The high-purity aqueous hydrogen peroxide solution which is concentrated after the fall within rectifying column 21 is taken out as a purified aqueous hydrogen peroxide solution from line 23 at the bottom of the column.

As a material for rectifying column 21, for example, aluminum, an aluminum alloy, stainless steel, zirconium, or a fluororesin can be used. For suppressing decomposition of hydrogen peroxide, aluminum or an aluminum alloy is preferably used.

The vapor from the top of rectifying column 21 passes through line 22 and goes into condenser 24. Reflux water is fed to the top of rectifying column 21 from line 26. The flow rate of the reflux water fed from line 26 is preferably controlled so that the hydrogen peroxide concentration of the purified aqueous hydrogen peroxide solution taken out from the bottom of rectifying column 21 becomes 40 to 70 wt %. The reflux water is preferably pure water, such as ion-exchanged water or distilled water. The reflux water may contain phosphoric acid (pyrophosphoric acid).

The crude aqueous hydrogen peroxide solution as a raw material originally contains low boiling-point, low molecular-weight organic impurities. The organic impurities rise inside rectifying column 21 and are discharged from line 25 for condenser 24, together with condensed water containing substantially no hydrogen peroxide. The low boiling-point organic impurities are discharged from condenser 24, so that the amount of the organic impurities contained in the aqueous hydrogen peroxide solution separated in gas-liquid separator 14 is reduced. Specifically, the amount of the organic impurities contained in the aqueous hydrogen peroxide solution separated in gas-liquid separator 14 is smaller than that in the crude aqueous hydrogen peroxide solution used in the purifying and concentrating operation by the amount of the removed low boiling-point organic impurities.

By the method for producing a purified aqueous hydrogen peroxide solution according to the present embodiment, there can be obtained the following advantageous effects that cannot be achieved by a conventional method.

(1) The high-concentration separated liquid separated in the gas-liquid separator is diluted so as to have a concentration almost equivalent to that of the crude aqueous hydrogen peroxide solution which is a raw material. The diluted separated liquid is re-purified and concentrated, together with the raw material. By virtue of this, a purified aqueous hydrogen peroxide solution having a high purity and high concentration can be produced with higher production efficiency than that of a conventional method.

(2) The purified aqueous hydrogen peroxide solution obtained by this method has reduced an organic impurity content, as compared to a conventional aqueous hydrogen peroxide solution of general purity quality.

(3) Further, by subjecting the separated liquid separated in the gas-liquid separator to ion-exchange treatment, the stability of the raw material to be re-concentrated can be improved. This not only suppresses decomposition of hydrogen peroxide during the series of purifying and concentrating treatments but also further improves the production efficiency of the purified aqueous hydrogen peroxide solution which is a final product.

Examples

The present invention will be described with reference to the following specific Examples, which should not be construed as limiting the scope of the present invention.

Figure 4:
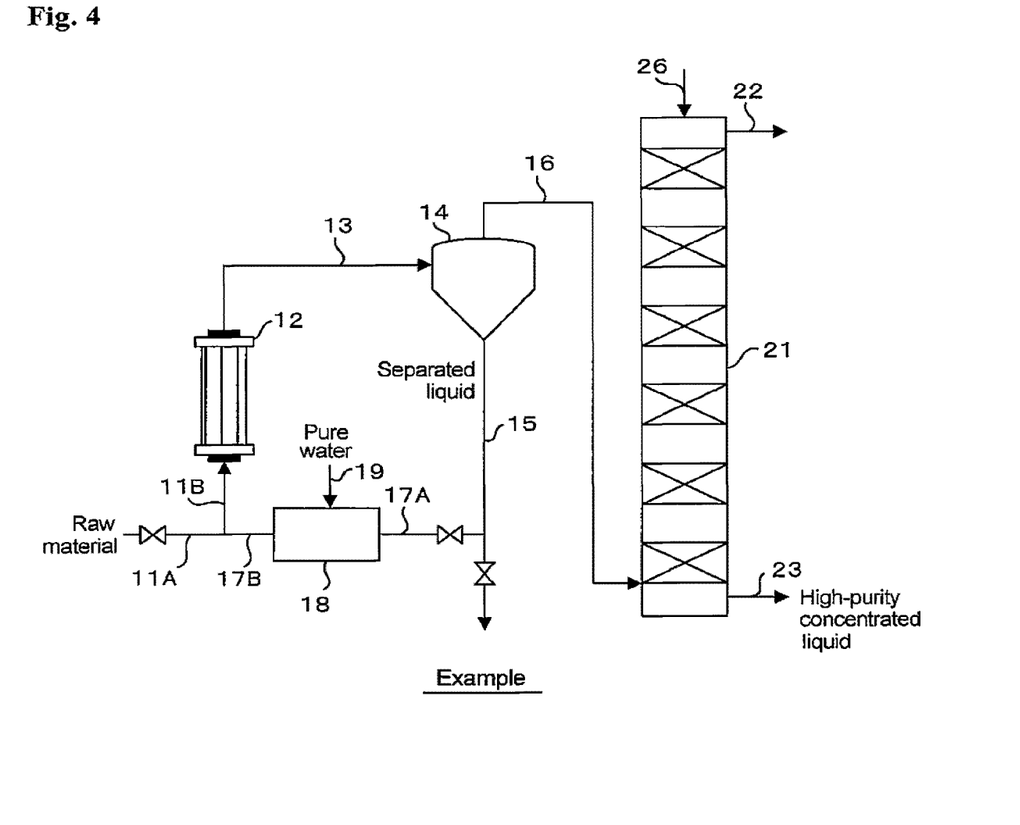
FIG. 4 The system for producing a purified aqueous hydrogen peroxide solution in the Example.
Figure 5:
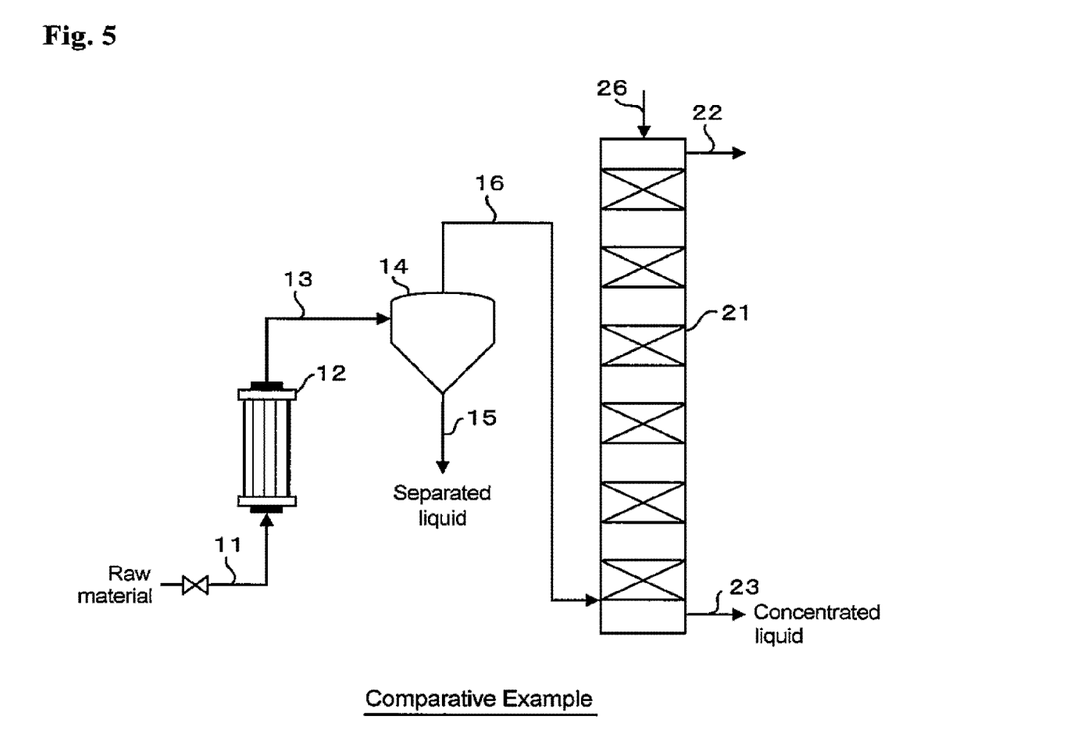
FIG. 5 The system for producing an aqueous hydrogen peroxide solution in the Comparative Example.

FIG. 4 shows the system for producing a purified aqueous hydrogen peroxide solution in the Example. FIG. 5 shows the production system in the Comparative Example. Specifications of the elemental devices shown in the figures are as follows.

Cyclone (Gas-Liquid Separator):
Standard cyclone described in the Perry's Chemical Engineer's Handbook
Cyclone diameter Dc: 35 mm Rectifying Column:
Column diameter: 55 mm
Packing material: Magnetic raschig ring (diameter: 6 mm; packing height: 350 mm)

In the purifying and concentrating devices shown in FIG. 4, a crude aqueous hydrogen peroxide solution raw material having a hydrogen peroxide concentration of 30.8 wt % was fed to line 11A at a flow rate of 414.3 g/h and vaporized in vaporizer 12. The operating conditions for vaporizer 12 are as shown below.

Vaporizer:
Outlet temperature: 68 to 70° C.
Outlet pressure: 12 to 13 kPa (90 to 100 Torr)

The separated liquid obtained in cyclone 14 had a hydrogen peroxide concentration of 62 wt %. This high-concentration separated liquid was diluted in concentration controlling device 18. Specifically, using pure water fed from line 19, the separated liquid was diluted so that the hydrogen peroxide concentration became 31 wt %. Further, in concentration controlling device 18, the separated liquid was subjected to filtration using a filter, and further the separated liquid was brought into contact with a cation-exchange resin to remove the metal components in the separated liquid. Then, the concentration-controlled aqueous solution which had been subjected to dilution and impurity removal treatments was recycled as a re-concentration liquid to the crude aqueous hydrogen peroxide solution which is a raw material, and these solutions were mixed with each other.

The vapor separated in cyclone 14 was fed to rectifying column 21 through line 16, and further purified and concentrated in rectifying column 21. Reflux water having a phosphoric acid concentration of 60 ppb was fed to rectifying column 21 from line 26. As a result, a high-purity purified aqueous hydrogen peroxide solution was obtained from line 23 at the bottom of rectifying column 21.

The operating conditions for rectifying column 21 are as shown below.

Rectifying Column:
Column top temperature: About 50° C.
Column top pressure: About 6.7 kPa (about 50 Torr)
Reflux water flow rate: 160 to 180 g/h The results of the measurement of a flow rate and a hydrogen peroxide concentration with respect to each of the raw material (crude aqueous hydrogen peroxide solution), the re-concentration liquid recycled to the raw material, the separated liquid, and the purified aqueous hydrogen peroxide solution in the steady state are shown in Table 1. In Tables 1 to 3 below, the results of the measurement made for the case where the same devices as in the present Example were used and re-concentration was not performed are shown as Comparative Example.

TABLE 1

|  | Raw material (Crude aqueous H2O2 solution) | | Re-concentration liquid | Separated liquid | | Purified aqueous H2O2 solution | |
| --- | --- | --- | --- | --- | --- | --- | --- |
|  | Flow rate | H2O2 Concentration | Flow rate | Flow rate | H2O2 Concentration | Flow rate | H2O2 Concentration |
| Example | 414.3 g/h | 30.8 wt % | 519.7 g/h | 258.6 g/h | 61.9 wt % | 205.9 g/h | 58.9 wt % |
| Comparative Example | 836.0 g/h | 30.8 wt % | 0.0 g/h | 198.1 g/h | 65.0 wt % | 194.3 g/h | 60.6 wt % |

In the present Example, almost all the hydrogen peroxide contained in the crude aqueous hydrogen peroxide solution which is a raw material is contained in the purified aqueous hydrogen peroxide solution which has been concentrated in rectifying column 21. For quantitatively explaining this, the ratio of the amount of the hydrogen peroxide contained in the purified aqueous hydrogen peroxide solution to 100 parts by weight of the hydrogen peroxide contained in the raw material was calculated according to the formula below. The results are shown in Table 2.

$$\text{H2O2 Amount ratio} = \frac{\text{Purification flow rate} \times \text{H2O2 Concentration of purified aqueous hydrogen peroxide solution}}{\text{Feed flow rate} \times \text{H2O2 Concentration of crude aqueous hydrogen peroxide solution}} \times 100 \text{ Parts by weight} \quad \text{[Mathematical formula 1]}$$

In the above formula, the feed flow rate means a flow rate of the crude aqueous hydrogen peroxide solution fed to line 11A. The purification flow rate means a flow rate of the purified aqueous hydrogen peroxide solution obtained from line 23.

TABLE 2

|  | Raw material (Crude aqueous H2O2 solution) | | Purified aqueous H2O2 solution | | H2O2 Amount ratio (To 100 parts by weight of raw material) |
| --- | --- | --- | --- | --- | --- |
|  | Feed flow rate | H2O2 Concentration | Purification flow rate | H2O2 Concentration | |
| Example | 414.3 g/h | 30.8 wt % | 205.9 g/h | 58.9 wt % | 95.0 Parts by weight |
| Comparative Example | 836.0 g/h | 30.8 wt % | 194.3 g/h | 60.6 wt % | 46.4 Parts by weight |

As can be seen from Table 2, in the Comparative Example in which re-concentration was not performed, the ratio of the hydrogen peroxide in the purified aqueous hydrogen peroxide solution to 100 parts by weight of the raw material was 46.4 parts by weight. In contrast, in the Example, the ratio of the hydrogen peroxide in the purified aqueous hydrogen peroxide solution to 100 parts by weight of the raw material was 95.0 parts by weight.

As apparent from the above, in the present Example, a high-purity purified aqueous hydrogen peroxide solution can be produced with higher production efficiency than that of a conventional method.

Next, the results of the measurement of a TC (total carbon) concentration and a stability with respect to each of the raw material (mixed raw material in the present Example), the separated liquid, and the purified aqueous hydrogen peroxide solution are shown in Table 3.

The stability of hydrogen peroxide was measured in accordance with HS K 1463:2007.

TABLE 3

| | Mixed raw material (Raw material + Re-concentration liquid) | | Separated liquid | | Purified aqueous H2O2 solution | |
|---|---|---|---|---|---|---|
| | TC Concentration | Stability | TC Concentration | Stability | TC Concentration | Stability |
| Example | 85.2 ppm | 99.6% | 214.3 ppm | 98.3% | 12.1 ppm | 97.2% |
| | Raw material | | Separated liquid | | Purified aqueous H2O2 solution | |
| | TC Concentration | Stability | TC Concentration | Stability | TC Concentration | Stability |
| Comparative Example | 97.3 ppm | 97.9% | 164.4 ppm | 98.2% | 26.2 ppm | 98.8% |

As can be seen from Table 3, in the Comparative Example, the purified aqueous hydrogen peroxide solution taken out from the rectifying column had a TC concentration of 26.2 ppm. In contrast, in the Example, the purified aqueous hydrogen peroxide solution had a TC concentration of 12.1 ppm. As apparent from the above, in the present Example, the amount of the organic impurities contained in the purified aqueous hydrogen peroxide solution can be markedly reduced, as compared to that in a conventional method. Accordingly, the purity quality of the purified aqueous hydrogen peroxide solution finally produced can be remarkably improved.

Further, as can be seen from Table 3, in the Comparative Example, the JIS stability of the raw material is 97.9%, whereas, in the Example, the stability of the mixed raw material is 99.6%, and, from this, it is apparent that the stability of the raw material is improved in the Example.

In the present Example, the separated liquid is subjected to dilution with pure water and cation exchange treatment. For comparison, the stability was measured for the case where an experiment was made under substantially the same conditions as in the Example except that no ion-exchange treatment was conducted. As a result, as seen from Table 4, the JIS stability of the mixed raw material was 96.5%. From this, it is considered that, to a certain extent, subjecting the separated liquid to ion-exchange treatment contributes to an improvement of the stability of the raw material, especially the stability to heat.

TABLE 4

| | Dilution | Dilution + Cation exchange |
|---|---|---|
| Stability of mixed raw material (JIS K 1463: 2007) | 96.5% | 99.6% |

DESCRIPTION OF THE REFERENCE NUMERALS

11A; 11B: Line
12: Vaporizer
13: Line
14: Gas-liquid separator (Cyclone)
15; 16; 17A; 17B: Line
18: Concentration controlling device
21: Rectifying column
22; 23: Line
24: Condenser
25; 26: Line
101: Line
102: Vaporizer
103: Line
104: Gas-liquid separator
105: Line
106: Rectifying column
107: Line
108: Condenser
109; 110; 111; 112: Line

The invention claimed is:

1. A method for producing a purified aqueous hydrogen peroxide solution, comprising the steps of: vaporizing a raw material containing a crude aqueous hydrogen peroxide solution (step A); condensing at least part of the gas liquor obtained in the step A to separate it into a gas phase and a liquid phase (step B); and recycling at least part of the separated liquid which is the liquid phase separated in the step B to the raw material (step C),
   wherein the step C further comprises the step D of controlling the hydrogen peroxide concentration of the separated liquid.

2. The method for producing a purified aqueous hydrogen peroxide solution according to claim 1, wherein the step D is performed by diluting the separated liquid with water.

3. The method for producing a purified aqueous hydrogen peroxide solution according to claim 1, wherein the step C further comprises the step E of removing impurities from the separated liquid.

4. The method for producing a purified aqueous hydrogen peroxide solution according to claim 3, wherein the step E is performed by bringing the separated liquid into contact with an ion-exchange resin.

5. The method for producing a purified aqueous hydrogen peroxide solution according to claim 1, wherein the step C further comprises the step F of adding a stabilizer to the separated liquid.

6. The method for producing a purified aqueous hydrogen peroxide solution according to claim 1, which further comprises the step G of concentrating the gas phase separated in the step B to obtain a purified aqueous hydrogen peroxide solution.

7. The method for producing a purified aqueous hydrogen peroxide solution according to claim 1, wherein the step A is performed using a vaporizer.

8. The method for producing a purified aqueous hydrogen peroxide solution according to claim 1, wherein the step B is performed using a gas-liquid separator.

9. The method for producing a purified aqueous hydrogen peroxide solution according to claim 8, wherein the gas-liquid separator is a cyclone.

* * * * *